United States Patent [19]

Debouzie et al.

[11] Patent Number: 4,826,722

[45] Date of Patent: May 2, 1989

[54] FORMING OF FELTS WHICH HAVE AN ISOTROPIC STRUCTURE

[75] Inventors: Alain Debouzie, Petite Couronne; Francois Bouquet, Rantigny; Alain De Meringo, Paris, all of France

[73] Assignee: Saint-Gobain Recherche, Aubervilliers Cedex, France

[21] Appl. No.: 62,379

[22] Filed: Jun. 15, 1987

Related U.S. Application Data

[63] Continuation of Ser. No. 916,111, Oct. 7, 1986, abandoned, which is a continuation of Ser. No. 702,070, Feb. 15, 1985, Pat. No. 4,632,685.

[51] Int. Cl.[4] ............................................. D04H 1/08
[52] U.S. Cl. .................................... 428/280; 427/365; 427/366; 427/369; 427/370; 427/389.8; 428/289; 428/290; 428/410; 428/426
[58] Field of Search ............... 428/280, 409, 410, 289, 428/290, 416; 427/369, 370, 389.8, 365, 366

[56] References Cited

U.S. PATENT DOCUMENTS

| | | | |
|---|---|---|---|
| 1,948,395 | 2/1934 | Powell | 65/9 |
| 2,958,919 | 11/1960 | Palmer | 65/9 X |
| 3,045,316 | 7/1962 | Gilhart | 65/9 X |
| 3,152,200 | 10/1964 | Kleist | 264/115 |
| 4,146,564 | 3/1979 | Garrick et al. | 264/516 |
| 4,496,633 | 1/1985 | Nowobilski | 428/426 |
| 4,508,673 | 4/1985 | Stahl et al. | 264/120 |
| 4,567,078 | 1/1986 | Blackmore et al. | 428/288 |

Primary Examiner—James J. Bell
Attorney, Agent, or Firm—Oblon, Fisher, Spivak, McClelland & Maier

[57] ABSTRACT

The invention relates to the forming of felts, the fibres of which are disposed in random directions.

These felts are obtained by depositing the fibres which are carried by a current of gas on a gas-permeable conveyor, the fibres, prior to being deposited, being coated with a binder composition. The felt constituted on the conveyor is subject to at least a longitudinal compression, the intensity of which is regulated in such a way that no creases form on the surface.

The felts obtained are highly resistant to compression, to tearing and to flexion.

2 Claims, 4 Drawing Sheets

FORMING OF FELTS WHICH HAVE AN ISOTROPIC STRUCTURE

This application is a continuation of application Ser. No. 916,111, filed on Oct. 7, 1986, now abandoned, which is a continuation, of application Ser. No. 702,070, filed Feb. 15, 1985, now U.S. Pat. No. 4,632,685, granted Dec. 30, 1986.

BACKGROUND OF THE INVENTION

Field of the Invention

The invention relates to the forming of felts, the fibres of which are disposed in random directions. More particularly, the invention relates to felts formed from mineral fibres which are designated by the generic names of glass wool, rock wool, etc.

Traditionally, mineral fibre felts are constituted continuously by depositing on a conveyor the fibres which are carried by currents of gas. The conveyor retains the fibres and allows the gases to pass through it.

Before they are deposited on the conveyor, the fibres are coated with a resinous composition intended to bind the fibres to one another, so imparting their cohesion to the felt which is thus constituted. The resinous composition applied in liquid form is crosslinked by heat treatment carried out on the felt which has been previously brought to the desired conditions of thickness and volumetric mass.

The conventional methods of felt formation result in products, the properties of which do not entirely satisfy all the demands imposed on them by certain particular applications. Over and above the insulating properties which are quite generally required, it is thus sometimes necessary for the products used to have very specific mechanical qualities. That is, for example, the case with products which support masonry elements and which must therefore withstand high levels of compression, such as elements which are used for the insulation of flat roofs which are accessible to traffic. It is also the case with products used in outdoor insulation and which must in particular be able to withstand tearing stresses.

In order to obtain products which have these specific qualities and also others which we will examine hereinfter, it is necessary to modify the conventional felt forming processes.

Felt formation by the deposition of fibres on the receiving conveyor or on a similar member leads to tangling which is not homogeneous in all directions. Experimentally, it is found that the fibres have a marked tendency to assume positions parallel with the receiving surface. This tendency is all the more marked the longer the fibres are.

This structure of felts is favourable to their insulating properties and also to their resistance to traction in the longitudinal direction. Such a structure is consequently advantageous for many uses. However, it will be appreciated that such a structure may not be the most suitable if, for example, the product is required to withstand compression or tearing in the direction of its width.

In order to improve resistance of these felts to compression, one solution lies in increasing their volumetric mass by increasing the number of fibres per unit of surface area on the receiving member where the felt is constituted. Apart from the fact that the mass of fibres per unit of surface area which can be deposited is limited, the accumulation of fibres on the receiving member rapidly opposes the passage of gases and therefore continuance of felt formation under good conditions, which makes it difficult if not impossible to improve other properties such as tearing resistance.

Another solution previously proposed resides in proceeding in such a way that the direction of the fibres is no longer in the plane of the felt but in a plane at a right-angle thereto. This arrangement is achieved, for example, by forming creases in the felt. These creases are in particular obtained either by disposing the felt in successive layers of greater or less length, extending in the direction of the desired final thickness, or by compressing the felt longitudinally. Under the effect of compression under the conditions envisaged, the felt forms undulations. Heat treatment of the binder composition which is carried out subsequently imparts a permanent character to this folded structure.

The direction of the fibres oriented in the direction of the thickness of the felt thus formed makes it possible substantially to improve the compression and tearing resistance. This structure is, however, disadvantageous with regard to resistance to longitudinal traction—the felt having a tendency to become unfolded—or to flexion.

The disposition of the fibres in the thickness may result also from assembling together strips of felt, the width of which corresponds to the thickness of felt desired, each strip being disposed in such a way that the fibres are in planes perpendicular to the faces of the constituted felt. The strips are maintained against one another by means of a coating or a film covering one or both faces of the felt. Possibly, the strips may also be glued directly to one another by their contacting surfaces.

The felts produced by this relatively complex technique, referred to as "layered cloths", are used mainly for insulating pipes. For this application, the flexion or even rolling capacity of the product obtained, instead of being a disadvantage, is particularly desirable.

An aim of the present invention is to provide felts in which the mechanical properties, particularly the resistance to compression and tearing in the direction of the thickness of the product, are improved without incurring any of the disadvantages previously encountered and consequently without any formation of creases, and without assembling together strips of felt.

Another object of the invention is likewise to provide felts having improved mechanical properties, and the insulation properties of which are still satisfactory.

Another object of the invention is to provide felts which exhibit the previously mentioned properties, while having the lowest possible volumetric mass.

SUMMARY OF THE INVENTION

In order to achieve these results, the invention proposes the manufacture of insulating felts in which the orientation of the fibres is, if not isotropic, then at least more random. Indeed, in the techniques previously mentioned, the formation of creases or the assembling together of strips of felt substantially do not basically alter the orientation of the fibres in the thickness of the felt. These fibres are oriented only according to the direction of the creases or strips. In contrast, according to the invention, an effort is made to ensure that the fibres in the very interior of the resultant felt assume directions which are as varied as possible without substantially modifying the general orientation of the layer of fibres.

According to the invention, the fibre felt collected on the receiving member, possibly after having undergone compression in the direction of its thickness, is compressed continuously in the longitudinal direction by passing between series of conveyors defining its underside and upper side, longitudinal compression resulting from the passage of one pair of conveyors driven at a certain speed to a pair of conveyors driven at a lower speed.

Prior compression in the direction of the thickness is normally necessary. Upon leaving the fibre receiving chamber, by reason of the manner in which the felt is constituted, considerable inhomogeneity of volumetric mass is found. While the part which is in contact with the conveyor is relatively compacted, the fibres to be found on the exposed face are disposed in a very light and irregular agglomeration.

The operation of compressing the felt in the direction of its thickness is therefore aimed at ensuring that the volumetric mass is more homogeneous whatever may be the particular point within the thickness of the felt which is under consideration. Satisfactory homogeneity is indeed one of the conditions required to ensure satisfactory rearrangement of the fibres resulting from longitudinal compression.

Furthermore, compression in the direction of the thickness contributes to the formation of a denser surface layer of fibres, similar to that which is formed on the other face of the felt which is in contact with the receiving conveyor.

The presence of this surface layer and maintenance of the felt on its two faces during the longitudinal compression operation also contribute to re-arrangement of the fibres inside the felt with no crease formation.

Furthermore, to avoid crease formation, compaction of the fibres being obtained in a restricted space, it is found experimentally that for each different operation, longitudinal compression has to be limited.

Various factors play an independent role in the establishing of this limit. It is particularly necessary to take into account the volumetric mass of the felt and its thickness, which to a certain extent determine the capacity of the felt to deform itself to fold itself over on itself. It will be appreciated particularly that a thick felt which is of a high volumetric mass has less of a tendency to form creases. It is also necessary to bear in mind the nature of the fibres of which the felt is constituted. The shorter the fibres are, the easier is rearrangement without crease formation.

Hereinafter, we will examine typical examples of felts made from mineral fibres and the way they behave in this type of operation. But at this juncture, for felts ordinarily used in the field of heat and sound insulation, we can consider that to avoid the formation of undesirable creases, the compression ratio, in other words the ratio of mass per unit of surface area after and prior to each compression is advantageously kept to below 10, and is preferably below 7.

However, the advantageous rates of compression vary considerably according to the quality of the fibres used for the felts. The coarser the fibres are, the lower will be the rate of compression for each operation. Thus, for fibres having a mean diameter substantially greater than 10 microns, the level of compression for each operation is preferably less than 5.

By proceeding thus, the inventors have found that fibres initially deposited in layers substantially parallel with the faces of the felt become located according to random directions within the felt while the fibres in contact with the conveyors remain substantially parallel with the faces. In other words, the loops which form in the product remain relatively small in size in relation to the thickness of the felt and do not affect the faces.

Surprisingly, the inventors have found that higher ratios of compression can be achieved if the compression is carried out in several successive stages, particularly with felts for which compression without crease formation is the hardest to achieve. They have also found that for one and the same final ratio of compression, the properties of the products obtained may be improved when compression is carried out in several stages. The invention therefore relates to methods of felt compression which are carried out in several successive stages.

The reasons for the improvements found in the multistage process are not entirely clear. It is possible that by limiting the compression imposed at each of the stages, it is possible to encourage the appearance of localised deformations of limited extent and subsequent deformations have their origin at points other than the first-mentioned, the result being to multiply the deformations whereas in a single stage, fewer deformations would have a tendency to affect a greater fraction of the thickness of the felt. This is only an hypothesis and the inventors do not wish to be bound thereby. However, examination of sections through felt would seem to confirm this theory: the loops in the case of the invention are small and well dispersed through the mass of the product.

The fibres on the faces of the product constitute layers which are virtually free from loops.

Of course, even when multiplying the number of longitudinal compression operations, the ratios of longitudinal compression which can be achieved are not unlimited. For reasons of a practical nature, the overall longitudinal compression ratio, that is to say for all the longitudinal compressions carried out on one felt, does not exceed 15.

Hereinafter in the description, details are given concerning the conditions of producing felt by the method according to the invention and also of the felts thus obtained by reference to the attached drawings.

Figure 1:
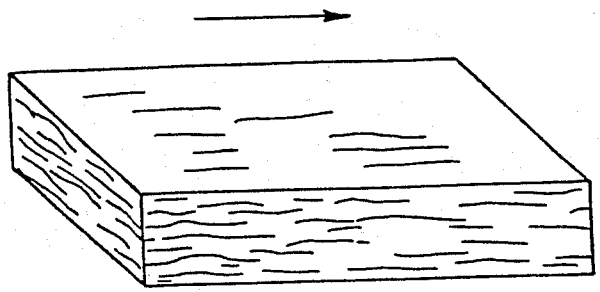
FIG. 1 diagrammatically shows in perspective a section through a sample of a felt obtained without longitudinal compression.

The dominant position of the fibres in a felt which has only undergone compression in the direction of the thickness is shown in FIG. 1. A vast majority of the fibres are disposed parallel with the faces of the felt or in a very closely identifiable position. The disposition of the fibres is substantially the same whether the felt is considered in the longitudinal sense, designated by an arrow, or in the transverse sense (in relation to the conveyor on which the felt is constituted). This type of felt offers good heat resistance but can be easily compressed or torn away easily in the direction of the thickness.

Figure 2:
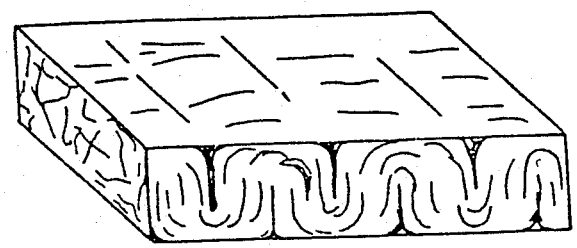
FIG. 2 is a view similar to FIG. 1, of a sample of felt compressed by prior art techniques.

Creased or pleated felts, as shown in FIG. 2, offer greater resistance to tearing and compression insofar as the presence of the creases is equivalent to arranging the fibres in the direction of the thickness of the felt. Deep folds appear on the faces of the felt. In the transverse direction, the structure of the cross-section varies according to the position of this latter in relation to the creases. This structure is not very resistant to flexion or to longitudinal traction.

Figure 3:
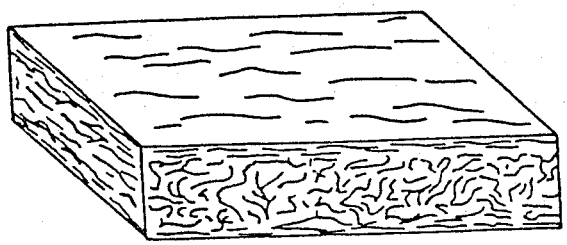
FIG. 3 is a view similar to the previous illustrations, of a sample of felt compressed according to the invention.

The felt in FIG. 3 shows what is obtained according to the invention. Longitudinally, great diversity in the direction of fibres is found in the centre of the product, with the absence of creases on the surface. Transversely and typically, the dominant direction remains parallel with the faces of the felt.

Figure 4:
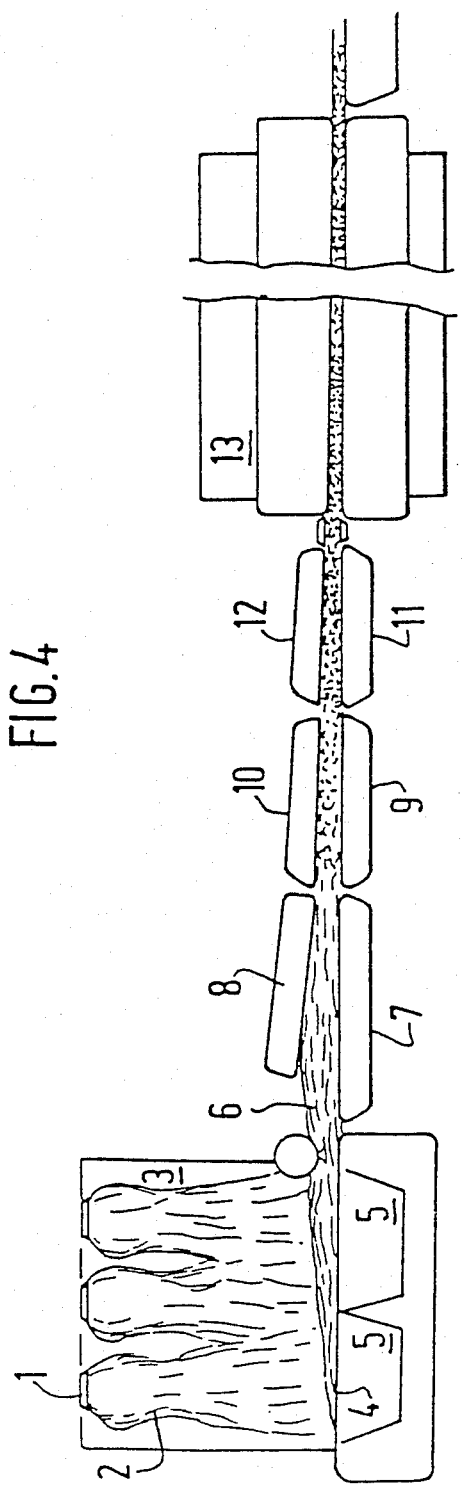
FIG. 4 is a diagrammatic view of a felt production line according to the invention.

FIG. 4 shows the general diagram of a felt forming plant. This diagram reveals three quite distinct parts, that in which the felt is formed from the fibres, that in which the felt is compressed in the manner corresponding to the invention and finally the part in which the felt is heat treated to cross-link the binder.

The felt forming plant is shown diagrammatically in the form of three centrifugal units 1. Implementation of the invention is not confined to any particular method of felt formation. The method to which reference is made is only that which, at industrial level, is the most widely used for forming glass fibre felts, but other methods are also very important, particularly those normally used for forming rock wool and which involve the use of an assembly of centrifugal wheels on the peripheral wall of which the material is carried to be accelerated and projected in the form of fibres.

Three centrifugal units 1 are mounted in series. In large installations, the number of centrifugal units may be as much as or even exceed a dozen.

The fibres produced by each of the centrifugal units 1 originally form an annular voile 2. They are entrained by gaseous currents to the bottom part of the receiving chamber 3 where there is situated a gas permeable receiving conveyor 4 which retains the fibres. Circulation of gases is carried out by a vacuum maintained under the receiving conveyor 4 from tanks 5 which are at a vacuum in relation to the atmosphere in the chamber 3.

The fibres are deposited on the conveyor to a thickness which goes on increasing until the conveyor reaches the exit from the receiving chamber.

Inside the chamber, means not shown spray onto the fibres a liquid binder composition. Conventionally, every effort is made to see that distribution of the binder over the fibre is as uniform as possible so that then the binder is homogeneously spread throughout the whole of the felt.

Ordinarily, the felt 6 emerging from the chamber 3 is relatively light. Its average volumetric mass is low for a considerable thickness. Furthermore, by reason of the method of felt formation, the fibres are principally orientated in directions parallel with the conveyor 4. By a succession of modifications, this felt will be brought to a substantially increased volumetric mass and to a varying fibre orientation.

According to the invention, these modifications preferably comprise a compression of the felt in the direction of its thickness. This compression is achieved for example as shown in FIG. 4 and in FIG. 5 by passing the felt 6 between two conveyors 7 and 8, the distance separating the two conveyors diminishing in the direction in which the felt progresses.

Thus compressed, the felt can then pass between pairs of conveyors 9, 10 and 11, 12, the speed of each pair being less than that of the preceding pairs of conveyors, occasioning a continuous longitudinal compression of the felt.

During this succession of modifications, the felt is permanently confined to avoid its regaining at least a part of its initial volume. It is then introduced directly into the oven 13 where heat treatment carries out cross-linking of the binder and stabilisation of the product.

On leaving the oven 13, the product is then cut up and packaged according to the envisaged uses.

Figure 5:
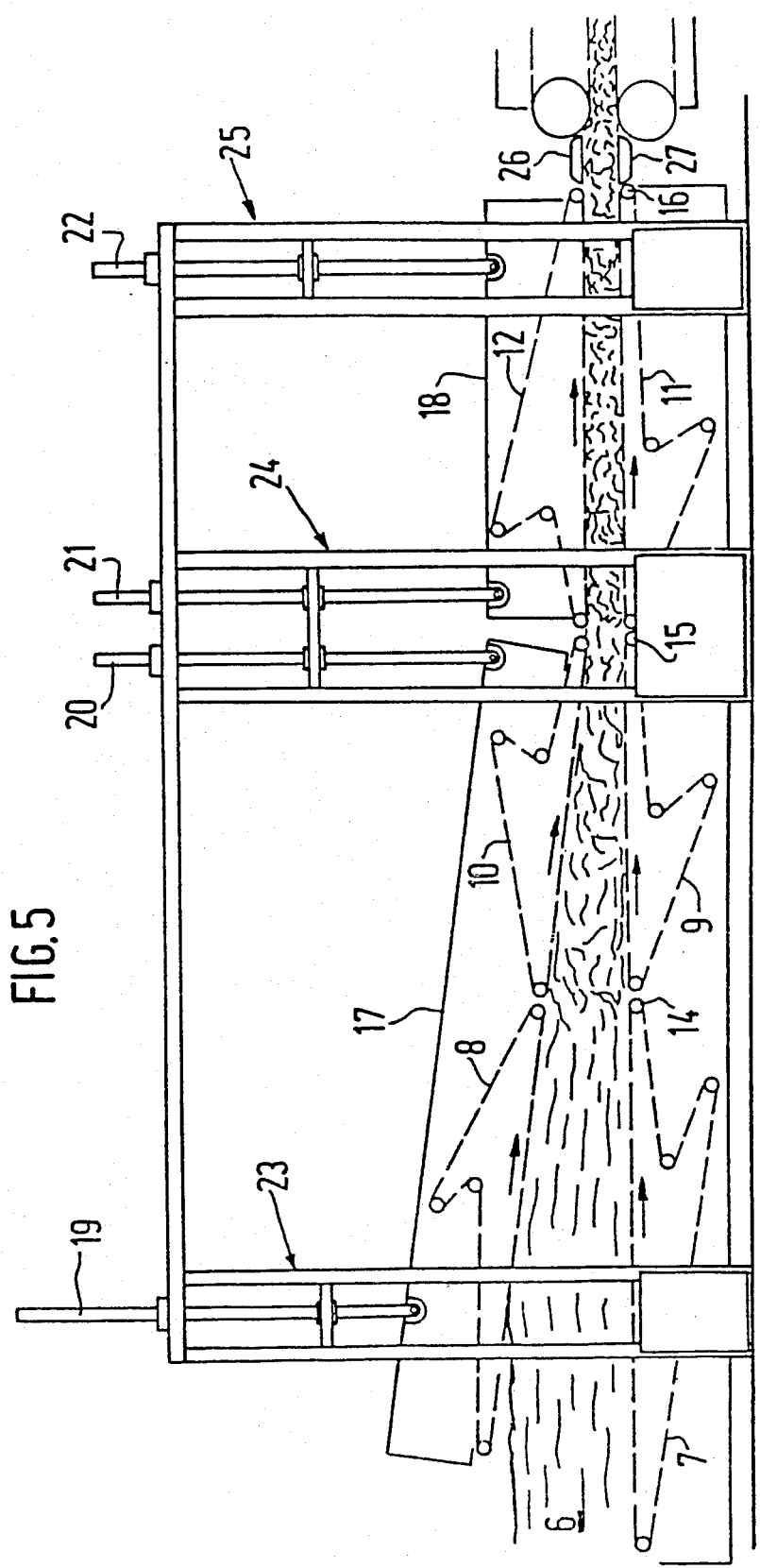
FIG. 5 is an enlarged and detailed view of the part of FIG. 4 in which compression of the felt is carried out.

Treatment of the felt according to the technique according to the invention is detailed in FIG. 5.

This drawing diagrammatically shows the train of conveyors 7, 9 and 11 on which the felt progresses until it enters the oven.

The faces of these conveyors carrying the felt are preferably in one and the same plane.

The grids, meshes or similar structures constituting these gas permeable conveyors rest on supports such as metal plates or rollers, not shown, which ensure that they are kept in the desired position.

The conveyors are set in motion by drive wheels 14, 15, 16 in conventional manner. The conveyors are driven without slip, for example by means of chains integral with them, in order to impart to the felt clearly defined speeds. The motors of each of the conveyors are independent from one another so as to permit of different settings.

Facing the conveyors 7, 9 and 11 there are three other conveyors 8, 10 and 12. Generally, the speeds of the pairs of conveyors 7, 8, 9, 10, 11, 12 are regulated to ensure the same rate of progress of the two faces of the felt. When, as shown in the drawing, one or more conveyors 8, 10 are inclined, this means that their speeds are slightly greater than those of the corresponding conveyors 7,9.

The conveyor 9, as noted earlier, provides not only for compression in the thickness of the product but uniformity of the volumetric mass at all points through this thickness. On contact with the conveyor 9 also, the fibres are caused to form the surface layer. For the conveyor 8, it is found experimentally that a speed slightly greater than that which corresponds to the progression imposed by the conveyor 7 can encourage formation of this surface layer and even to a certain extent favour re-arrangement of the fibres within the felt. The excess speed of the conveyor 8 must, however, be limited in order not to compromise the structure of the felt. Preferably, when such operating conditions are imposed, the excess of speed of the upper conveyor 8 ought not to exceed 10%.

The height of the conveyors 8, 10 and 12 in relation to the conveyors 7, 9 and 11 is adjustable. To this end, the conveyors 8, 10 and 12, the rollers not shown on which they rest and the corresponding motors which drive them are mounted on chassis shown diagrammatically at 17 and 18. These chassis 17 and 18 are suspended by adjustment rods 19, 20, 21, 22 from arches 23, 24, 25 which straddle the felt forming line.

Adjustment of the height of the rods 19, 20, 21, 22 is achieved by conventional means, for example by using screw jacks.

In the form shown, the two conveyors 8 and 10 are disposed on one and the same chassis 17 and are consequently simultaneously regulated. This constitutes only one possible arrangement. Should it seem more advantageous separately to adjust the inclination and height of the conveyors, it is of course suitable to dispose them on different chassis which can be adjusted independently of each other, as are chassis 17 and 18.

The adjustment of the height of the different conveyors depends both on the thickness of the felt 6 emerging from the receiving chamber 3 and the thickness of the final felt as it has to be introduced into the oven. Over and above these purely geometric considerations, the choice of the compression of the felt in the direction of its thickness is also governed by the behaviour of the felt in the longitudinal compression phase. We have already indicated in this respect that the appearance of modifications of structure desired depend on the volumetric mass of the felt, the thickness and the length of the fibres. Adjustment of the height of the conveyors makes it possible under the best conditions to determine the volumetric mass and thickness bearing in mind the initial thickness of the felt to be treated and the nature of the fibres from which it is made.

In this respect, it is important to note that the volumetric mass conditions relating to the felt at the moment of longitudinal compression and in the finished product may differ substantially. In practice, indeed, the most commercialised products which are resistant to compression are products which have a relatively high volumetric mass, where insulating products are concerned. It is normally between 30 and 50 kg/m$^3$. To achieve these volumetric masses, it is normal to carry out a final compression in the direction of the thickness at the time of introducing the material into the binder treating oven 13. Indeed, although to avoid crease formation during longitudinal compression it may be preferable to have a felt of sufficient volumetric mass, this same volumetric mass must not be too high, in which case rearrangement of the fibres would be equally difficult and might result in partial deterioration in the structure of the felt.

As an indication, for felts made from fibres having a mean diameter of around 6 to 14 microns and an average length of around a few centimetres, the initial compression of the felt in the direction of the thickness is preferably chosen so that the compressed felt has a volumetric mass which is preferably greater than 10 kg/m$^3$.

For lighter felts, re-arrangement of the fibres is likely to be less homogeneous, and this all the more so since, to achieve the volumetric masses characteristic of products sought after as resisting compression or tearing, the rates of longitudinal compression needed ought then to be very high.

In the same way, the compression operation is preferably carried out on felts having a volumetric mass which does not exceed 60 kg/m$^3$.

As we indicated hereinabove under operating conditions, the volumetric mass of the felt prior to longitudinal compression and the rate of compression imposed depend at least partially one upon the other. The higher the volumetric mass, the lower the compression rate will be.

To these conditions is added that concerning thickness. It will be appreciated that to allow the fibres to re-arrange themselves as was stated previously, it is necessary that at the moment of longitudinal compression, the felt must have a minimum thickness. For the felt mentioned in the preceding paragraph, thickness prior to longitudinal compression is preferably not less than 80 mm and is advantageously greater than 100 mm.

The conditions of volumetric mass and thickness can also be expressed by the mass of fibres per unit of surface area needed. In simplified form, it can be accepted that, in order to proceed under satisfactory conditions, the quantity of fibres on the conveyor prior to longitudinal compression is preferably greater than 0.75 kg/m$^2$.

In all cases, it is preferable for compression in the direction of the thickness should be carried out progressively to avoid damage to the fibres. The length of the conveyors 8 is advantageously selected so that the inclination in relation to the plane defined by the conveyor 7 is not greater than 20% and is preferably less than 15%.

When compression in the direction of the thickness has to be relatively considerable to reach the levels of volumetric mass desired, it may, as shown in FIG. 5, be advantageous to pursue compression started with conveyors 7 and 8 also with conveyors 9 and 10 (whether these latter are mounted on the same hassis or not). It is possible thus to avoid extending the line excessively.

Just as it is preferable to reduce the thickness progressively, it seems preferable for longitudinal compression not to be too abrupt. It is also desirable to obtain progressive reduction of the longitudinal speed or at least to spread this operation over a series of small reductions in speed.

Attempts along these lines have already been carried out employing series of rollers moving at ever-decreasing speeds. It was found to be very difficult to maintain these rollers in a satisfactory condition, fibres finding their way between successive rollers and finally cloging up the apparatus.

For these reasons, it seemed to be more advantageous to work with conveyors, which makes it possible to avoid difficulties of this type. Naturally, although it is possible to provide for a series of numerous successive conveyors travelling at progressively decreasing speeds, considerations of a practical nature limit the number of conveyors actually used.

Taking into account the longitudinal compressions useful for modifying the structure of the felt and the rates of compression admissible without forming surface creases, the number of felt speed reduction stages is limited to a small number. For certain cases, a single longitudinal compression is sufficient, while in other cases it is preferable to work in two stages as shown in FIG. 5, or in more than two stages.

In the drawing, the felt 6 which is partially compressed in thickness upon passing between conveyors 7 and 8, is introduced between conveyors 9 and 10 which are immediately in an extension of the previously mentioned conveyors. The speed of the conveyors 9 and 10 is less than that of the conveyors 7 and 8. The speed ratio gives the rate of longitudinal compression.

Since compression takes place upon passage from the first pair of conveyors to the second, it is necessary to leave the minimum gap between these latter so that the compressed fibre cannot escape through this gap. In practice, a gap of a few centimetres will be sufficient for the conveyors to move with no risk of friction and make it possible to maintain progression of the felt in the desired direction.

Possibly and in a general way, elements forming slideways may be provided in the gaps between the successive conveyors to insure good continuity in supporting the felt. These elements have a flat surface which is an extension of the surfaces of the two conveyors between which the element is disposed.

Upon passing between the conveyors 9 and 10, the felt which has been longitudinally compressed already continues to be compressed in its thickness and a second longitudinal compression is carried out when it passes from conveyors 9 and 10 to conveyors 11 and 12.

The rates of longitudinal compression for the two successive compression stages may be equal or different. In practice, it is preferable for these rates to be as close to one another as possible in order properly to distribute the modifications introduced into the structure of the felt, as shown previously.

In FIG. 5, the conveyor 11 and 12 are disposed parallel with each other. In other words, the felt is no longer compressed in its thickness, and this will be true even if a fresh compression is then carried out upon entry into the oven. At this stage of the conversion of the felt, the volumetric mass attained is indeed normally relatively high and to compress the felt it is necessary to exert relatively considerable pressure which is tricky with the conveyors normally used at this stage of the process. On the other hand, upon entering the oven, the felt passes between two large dimension rollers which can without difficulty exert a high level of pressure. Nevertheless, it is preferable for the reduction of thickness upon entering the oven not to be too great as otherwise the compression which would result might undesirably modify the structure of the felt as established by the longitudinal compression stages. In practice, it is preferable for the thickness upon entering the oven not to be greater than twice that of the finished product.

Continuity of support of the felt between the conveyors 11 and 12 and the conveyors in the oven may be difficult to provide without any intermediary, for reasons of a purely geometric nature. In this case, it is likewise possible to provide fixed elements 26 and 27 which may form a slideway. To avoid fibres clinging to such elements, it is advantageous for the elements to be heated.

By way of example, processing tests according to the invention were carried out on an apparatus such as is illustrated in FIG. 4, particularly in order to improve the compression resistance of insulating felts used in terraces and flat roofs.

The fibres are formed by centrifugal treatment in a centrifuge in which the material is brought to a drawable condition. Filaments are formed by passing the material through orifices situated on the periphery of the centrifuge. These filaments enter a stream of hot gas passing over the wall of the centrifuge. They are drawn out under the effect of centrifugal force and are thrown onto a cold wall where they break. In this way, relatively short filaments are obtained of around 1 to 3 cm average length and having a diameter of around 12 microns.

The fibres formed by a series of three centrifugal apparatuses are collected together on a conveyor belt after being coated with a phenol resin.

The mass of fibre per unit of surface area in the felt forming zone varies according to experiments between 1 and 3 kg/m$^2$.

The products prepared vary in thickness between 30 and 120 mm and their volumetric mass ranges from 50 to 150 kg/m$^3$.

The object of these tests is to produce insulating felts which in particular have a compression resistance determined for as low a volumetric mass as possible.

Figure 6:
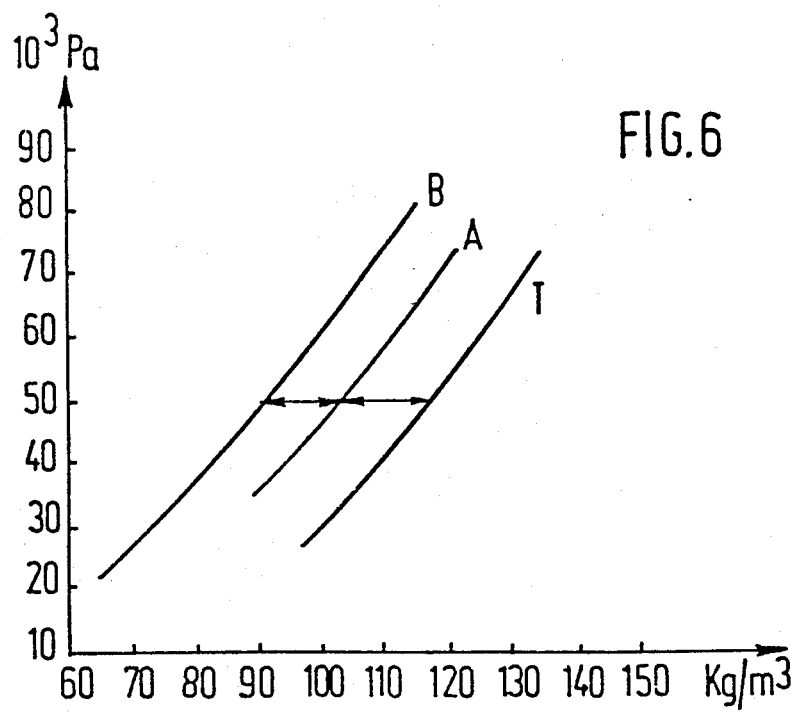
FIG. 6 is a diagram of the levels of resistance to compression as a function of volumetric mass and for various methods of production with or without compression, according to the invention.

FIG. 6 shows results for products prepared either without longitudinal compression (T) or with a longitudinal compression (A) or after two stages of longitudinal compression (B).

The speeds of the various conveyors used vary so that the rate of longitudinal compression for the single operation is equivalent to that corresponding to the two successive operations. The products compared have the same thickness, 50 mm.

The speed of the conveyor in the felt forming part is around 30 m/min. This speed is likewise that of the conveyors such as those illustrated at 7 and 8 (this latter is slightly greater as stated in order to compensate for inclination in respect of the direction of progress of the felt) in FIG. 5. The speed in the oven varies according to the volumetric mass of the products obtained and is between 7 and 10 m/min.

In practice, it is a good idea to maintain a fairly high speed for the fibre receiving conveyor in order to limit the mass of fibres per unit of surface area on the receiving conveyor. A number of advantages accrue therefrom, particularly the fact that circulation of the gases through the fibres deposited in a small thickness is easier. The vacuum effect which must be maintained under the receiving conveyor and hence the corresponding lower costs are reduced quite substantially. With this in mind, and longitudinal compression operation is favourable since for one and the same final volumetric mass, the speed of the receiving conveyor can be increased.

In both cases under consideration, the speeds of the intermediate conveyors 9 and 10 on the one hand and 11 and 12 on the other are established as follows: for a single compression operation, the speed of the conveyors 9 and 10 is unchanged at 35 m/min, that of the conveyors 11 and 12 and of the oven is between 9 and 10 m/min; for a double compression, the speed of 9 and 10 is between 18 and 20 m/min and that of 11 and 12 is between 1 and 10 m/min.

The height at introduction of the felt between conveyors 7 and 8 is regulated to be slightly greater than that of the felt. The distance separating the conveyors 9 and 10 at the point where the distance between the two is twice the thickness of the end product is 100 mm. The same distance separates the conveyors 11 and 12.

Measurement of compression resistance is carried out according to British Standards BS 2972. According to these specifications, a sample measuring 316×316 mm and 100 mm thick is subjected to pressure. The amount of this pressure is measured for a compression rate of 10%. The speed of travel of the compression plates is 1 mm/min.

FIG. 6 on which the results appear in the form of a graph shows that for one and the same resistance to compression, the sample obtained without longitudinal compression during formation of the felt is the one which requires the greatest volumetric mass. The divergence in respect of the sample of felt which has undergone longitudinal compression is of the order of 15%, which is considerable.

It is even more remarkable to note that there is an apparent divergence of approx. 10% in volumetric mass between the sample which has undergone a single compression and that which has undergone two longitudinal compression stages.

Figure 7:
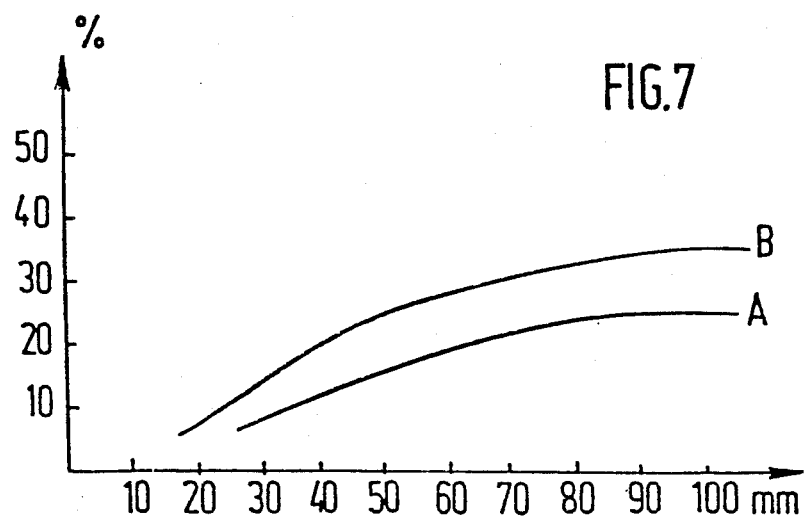
FIG. 7 is a diagram showing the evolution of the improvement in resistance to compression as a function of the thickness of the felt.

Tests performed on the same products to determine resistance to tearing are of the same kind. Felts which have undergone two compression stages are quite substantially better. It must be noted that longitudinal compression greatly enhances this resistance. The increase may be as much as or even exceed 100% in relation to values for products which are not treated according to the invention, that is to say which have not undergone longitudinal compression. The gains in volumetric mass which are found by proceeding according to the invention are a function of the thickness of the product. FIG. 7 shows for a wide variety of products, particularly products with a volumetric mass ranging from 70 to 1130 kg/m$^3$, the variation in gain in compression resistance for a felt prepared with one (A) or two (B) longitudinal compression stages.

It will be noted from the graph that the improvement increases with thickness and becomes very substantial after 30 mm and reaches a maximum divergence for thicknesses in excess of 50 mm.

Similar tests have been reproduced with felt prepared with finer and longer fibres (mean diameter 6 microns). The same characteristics were found.

Following these tests, it is likewise apparent that the improvements made are less substantial when the final volumetric mass is very low. Advantageous improvements have been observed for all glass fibre (or similar) felts, the volumetric mass of which is in excess of 50 kg/m$^3$.

Furthermore, by proceeding under the conditions laid down for the invention, it is found that no creases form which affect the entire thickness of the felt. Consequently, the resistance to longitudinal flexion in felts obtained remains within the range of values required in the light of the uses to which the products are to be put.

What is claimed as new and desired to be secured by letters patent of the United States is:

1. A felt having a plurality of faces, comprising fibers of a glass material coated with a binder composition, wherein the surface of said felt is suybstantially free of creases, and wherein, longitudinally, there is a substantial diversity in the direction of the fibers near the center of the felt, and wherein, transversely, the fiber direction is substantially parallel with the faces of the felt.

2. A felt having a plurality of faces, comprising fibers of a glass mateial coated with a binder composition, which is produced by:
    (a) coating said fibers of a glass mateial with a binder composition and distributing the same onto a receiving member retaining the fibers,
    (b) subjecting the felt to at least one longitudinal compression operation, the rate of which, defined by the ratio of fiber mass per unit of surface area after compression to that prior to compression, is limited to a value less than that at which creases form, to thereby effect the felt phases, and
    (c) subsequently heat treating the compressed felt to cross-link the binder composition, to thereby fix the structure of the felt.

* * * * *